US005456558A

United States Patent [19]

Horiuchi

[11] Patent Number: 5,456,558

[45] Date of Patent: Oct. 10, 1995

[54] GLOBOID WORM GEAR GENERATING METHOD

[75] Inventor: Akiyo Horiuchi, Obu, Japan

[73] Assignee: Sumitomo Heavy Industries, Ltd., Tokyo, Japan

[21] Appl. No.: 263,665

[22] Filed: Jun. 22, 1994

[51] Int. Cl.[6] .................... B23F 17/00

[52] U.S. Cl. .................... 409/26; 409/12; 451/47

[58] Field of Search .................... 409/12, 26, 38, 409/66, 48, 51; 51/33 R, 287; 451/47, 900

[56] References Cited

U.S. PATENT DOCUMENTS

| | | | |
|---|---|---|---|
| 3,641,708 | 2/1972 | Strejc | 51/33 R |
| 4,184,796 | 1/1980 | Sakai et al. | 409/12 |
| 4,475,319 | 10/1984 | Wirz | 409/12 X |
| 4,998,385 | 3/1991 | Umezono et al. | 409/12 X |
| 5,018,403 | 5/1991 | Umezono et al. | 409/38 X |
| 5,325,634 | 7/1994 | Kobayashi et al. | 409/38 X |

FOREIGN PATENT DOCUMENTS

| | | | |
|---|---|---|---|
| 62-9818 | 1/1987 | Japan | 409/12 |
| 62-22729 | 5/1987 | Japan . | |
| 62-19970 | 5/1987 | Japan . | |
| 2-232119 | 9/1990 | Japan . | |

*Primary Examiner*—William Briggs

*Attorney, Agent, or Firm*—Nikaido Marmelstein Murray & Oram

[57] ABSTRACT

There is disclosed a globoid worm gear generating method in which the surface of a globoid worm generating tool is defined as the tooth surface of an intermediate gear by an inverted conical surface whose semivertical angle $\gamma$ is $90°<\gamma<180°$, a relational movement similar to that of a globoid worm wheel is given to the tool so as to generate a globoid worm, and the worm wheel is generated by a wheel generating tool having a contour wholly or partially similar to that of the globoid worm, or in which the surfaces of a globoid worm generating tool are defined wholly or partially by two inverted conical surfaces whose semivertical angles $\gamma$ are $90°<\gamma<180°$, and the major axes as well as bottoms of the two inverted conical surfaces are coincident with each other so that both tooth surfaces of a worm may be simultaneously generated. By this method of the invention, the globoid worm gears can be generated within a short period of time.

4 Claims, 7 Drawing Sheets

GLOBOID WORM GEAR GENERATING METHOD

BACKGROUND OF THE INVENTION

1. Field of the Invention

The present invention relates to a globoid worm gear generating method in which tooth surfaces are ground by a tool representing an inverted conical surface.

2. Description of the Prior Art

Hitherto, as methods for generating globoid worm gears, there have been publicly known a method in which tooth surfaces of globoid worm gears (globoid worm gears having developable tooth surfaces) are ground and generated with a tool representing a plane, a method in which tooth surfaces of globoid worm gears are ground and generated with a tool representing a conical surface (see U.S. Pat. No. 4,184,796) and so on. A comparison will be made between the generating method using the plane tool and the generating method using the conical-surface tool. In the method utilizing the plane tool, the freedom of design is restricted and there exists a defect that both tooth surfaces of a worm gear cannot be generated simultaneously. Accordingly, the generating method with the use of the conical-surface tool has been widely employed at present.

This publicly-known generating method utilizing the conical-surface tool will now be described. As shown in FIG. 11, a tool 2 rotated by a motor 1 has conical surfaces. Both conical surfaces of the tool 2 simultaneously generate a globoid worm gear 3.

However, the aforesaid publicly-known worm gear generating method with the conical-surface tool 2 is not always advantageous in view of cost. This is because it take a long period of time to mill and to grind the worm gears.

A method for generating globoid worm gears with a milling cutter of an inverted conical shape has been proposed (see Japanese Patent Unexamined Publication No. 2-232119).

This method will be explained with reference to FIG. 12. Rotation of a motor 11 is transmitted to a holder 14 by means of a pulley 12 and a belt 13. A cutting tool 15 for milling is attached to the holder 14. The cutting tool 15 cuts a globoid worm gear 16 when the holder 14 is rotated.

Such method of cutting the globoid worm gear 16 by the cutting tool 15 of the inverted conical shape, has an advantage that a period of time required for cutting is shortened. However, the tooth surface of the gear is rough because of the cutting by means of the cutting tool 15, so that there arises a necessity of finish-grinding the surface with a grindstone. Normally, a difference between a contour of a conical grindstone gear made of a conical-surface grindstone for the finish-grinding and a contour of the threaded gear produced by the cutting tool of the inverted conical shape is large so that a grinding stock is increased. As a result, a period of time of grinding for finishing the surface of the gear disadvantageously becomes longer after all.

In view of the above, an object of the present invention resides in providing a novel method for generating globoid worm gears by which the gears can be generated in a short period of time.

SUMMARY OF THE INVENTION

Characteristics of the present invention exist in the following structures.

According to a first aspect of the invention, there is provided a method for generating globoid worm gears based on the basic member gear theory, wherein the surface of a globoid worm generating tool is defined as the tooth surface of an intermediate gear wholly or partially by an inverted conical surface whose semivertical angle $\gamma$ is $90° < \gamma < 180°$, a relational movement similar to that of a globoid worm wheel is given to the tool so as to generate a globoid worm, and the worm wheel is generated by a wheel generating tool having a contour wholly or partially similar to that of the globoid worm.

According to a second aspect of the invention, there is provided a method for generating globoid worm gears based on the basic member gear theory, wherein the surfaces of a globoid worm generating tool are defined as the tooth surfaces of an intermediate gear wholly or partially by two inverted conical surfaces whose semivertical angles $\gamma$ are $90° < \gamma < 180°$, and the major axes as well as bottoms of the two inverted conical surfaces are coincident with each other so that both tooth surfaces of a worm gear may be simultaneously generated.

BRIEF DESCRIPTION OF DRAWINGS

FIG. 4 shows a difference among semivertical angles of the surfaces of the worm gear generating tools, in which

DETAILED DESCRIPTION OF THE PREFERRED EMBODIMENT

One embodiment of the present invention will now be described with reference to the drawings.

Prior to the description of the embodiment of the present invention, the gist of the invention will be explained. Taking it into account that a period of time of cutting is shortened in case of using the above-described cutting tool of the inverted conical shape for milling, the present invention aims to generate globoid worm gears with a tool representing an inverted conical-shape.

The present invention will be explained below while adding descriptions of generating methods with a conventional publicly-known plane tool, a conical-surface tool and a cutting tool of an inverted conical shape for milling, in order to help understanding of the present invention.

At first, a generating method using a plane tool will be explained.

High efficiency of globoid worm gears having developable tooth surfaces, which are based on the basic member gear theory in KIKAI GAKKAI RONBUN (Journal of Japan Society of Mechanical Engineers), 1955, Vol. 21, No. 102, Page 164, Sakai as well as the secondary action theory in the same, 1972, Vol. 38, No. 311, Page 1895, Sakai and Maki, has been already proved and widely accepted in the art. However, in generating the conventional globoid worm gears having developable tooth surfaces (of the type reported in KAKAI GAKKAI KOENSHU RONBUN, Reports in Conference held by Japan Society of Mechanical Engineers, No. 740-15, Sakai and Maki), a tooth surface of an intermediate gear is a plane, and the plane is in parallel with the axis of the intermediate gear. These two conditions have restricted the freedom of globoid worm gear design. Especially in case of designing low-gear-ratio worm gears, the inconvenience resulting from the conditions is considerable.

In addition, there has been a defect that because of the use of a tool representing a plane (a plane tool), both tooth surfaces of a thread of a worm cannot be generated simultaneously.

An explanation will now be made of a case in which globoid worm gears are generated based on the basic member gear theory and the secondary action theory.

Figure 1:
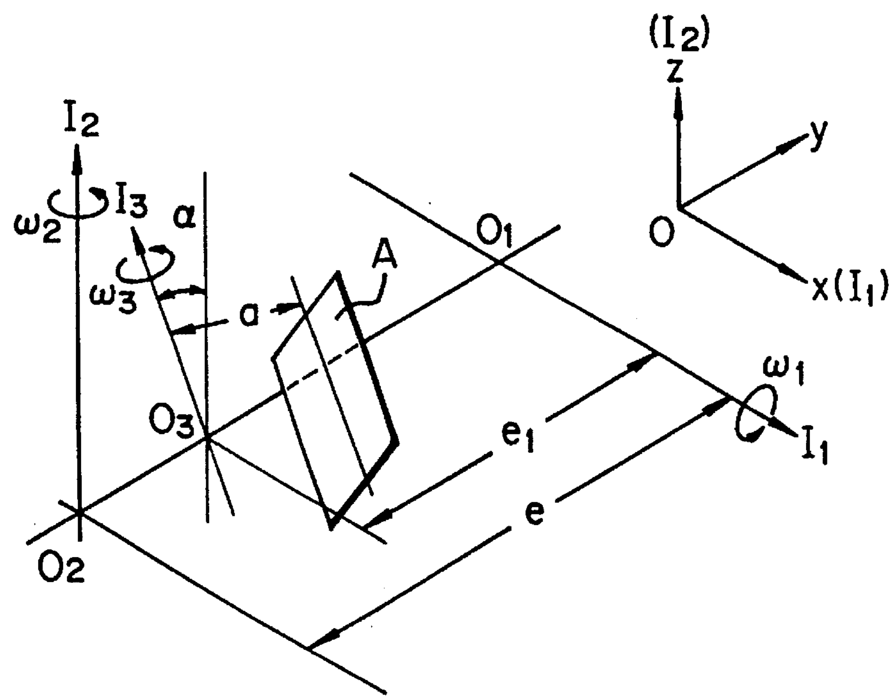
FIG. 1 is a view showing the relationship between the axes of a worm, a wheel and an intermediate gear when the worm gears are generated by a plane tool.

Referring to FIG. 1, $I_1$ denotes the axis of a worm; $I_2$, the axis of a wheel; and $I_3$, the axis of an intermediate gear. In the righthanded cartesian coordinate system O-xyz as an absolute coordinate fixed in the space, the x-axis corresponds to the axis $I_1$; the z-axis, to the axis $I_2$; and the y-axis, to the perpendicular $O_2O_1$ between the axes $I_1$ and $I_2$. The axis $I_3$ intersects at right angles the perpendicular $O_2O_1$ at a point $O_3$, and makes an angle $\alpha$ to the axis $I_2$. ($O_1$ and $O_2$ denote the points of intersection between the perpendicular $O_2O_1$ between the axes $I_1$ and $I_2$ and the worm axis $I_1$ and the wheel axis $I_2$, respectively.)

In the case where angular velocities of the worm axis $I_1$, the wheel axis $I_2$ and the intermediate gear axis $I_3$ are represented by $\omega_1$, $\omega_2$, $\omega_3$, a translation velocity of the intermediate gear axis $I_3$ therealong is represented by $\omega_3$, rotational ratios i, j, h are expressed by $\omega_1/\omega_2$, $\omega_1/\omega_3$, and $\omega_3/\omega_3$ (the ratio h being in term of pitch of screw motion of the intermediate gear), a distance between $O_2$ and $O_1$ is expressed by e, and a distance between $O_3$ and $O_1$ is expressed by $e_1$, the following conditions or equations must be satisfied:

$$e_1=e\cdot\cos^2\alpha \tag{1}$$

$$j=i\cdot\cos\alpha-\sin\alpha \tag{2}$$

$$h=\underline{\omega}_3/\omega_3=c\cdot\sin\alpha\cdot\cos\alpha \tag{3}$$

Reversely, the tooth surface of a gear cutting tool in any suitable configuration is attached to the axis $I_3$ which satisfies the equations (1) to (3) to machine a worm blank on the axis $I_1$ and a worm wheel blank on the axis $I_2$. Then, the line of contact between the worm and wheel coincides with the line of contact between the intermediate gear and worm (this coincident line of contact is called "the first line of contact"). The globoid worm gear generating method described above is called the indirect generating method.

Especially, when $\alpha=0$, the intermediate gear axis $I_3$ coincides with the wheel axis $I_2$, and when $\alpha=90°$ the intermediate gear axis $I_3$ coincides with the worm axis $I_1$ so that the intermediate gear may not be taken into consideration. Thus, the gear generating method in this case is called the direct generating method.

Further, according to the "secondary action theory" when a worm wheel is directly generated by a generating tool wholly or partially similar in configuration to a worm generated by an intermediate gear which satisfies the above equations (1), (2) and (3), the worm and worm wheel simultaneously contact with each other along another line of contact (which is called "the second line of contact") in addition to the first line of contact. Furthermore, at a point where the worm and worm wheel contact only one time (to be referred to as "limit normal point"), the relative radius of curvature becomes infinity ($\infty$). In practice the curve (to be referred to as "limit normal point curve") at which it can be expected that the relative radius of curvature becomes infinity ($\infty$) is preferably within the zone of contact between the worm and worm wheel so that there arises a problem how to determine the tooth profile of the intermediate gear.

In the globoid worm gear having developable tooth surfaces, the tooth surface of the intermediate gear is a plane A (a plane tool) in parallel with the intermediate gear axis $I_3$ and spaced apart therefrom by a distance a. The employment of this plane results in the advantage that the translation of the intermediate gear axis $I_3$ may be eliminated when machining. Furthermore, in respect of efficiency, the limit normal point curve can be brought into the zone of contact so that high efficiency worm gears have been produced.

A globoid worm gear generating method by a tool representing a conical surface will be described hereinafter.

The globoid worm gear generating method by the conical-surface tool is also based on the basic member gear and secondary action theories described above. Accordingly, the positional relationships between the respective axes are similar to those in FIG. 1, and the above three conditions or equations (1), (2) and (3) must be equally satisfied. In addition, the essential feature of this method resides in the fact that the tool surface of an intermediate gear employs a conical surface (a conical-surface tool) on the basis of these conditions.

Figure 2:
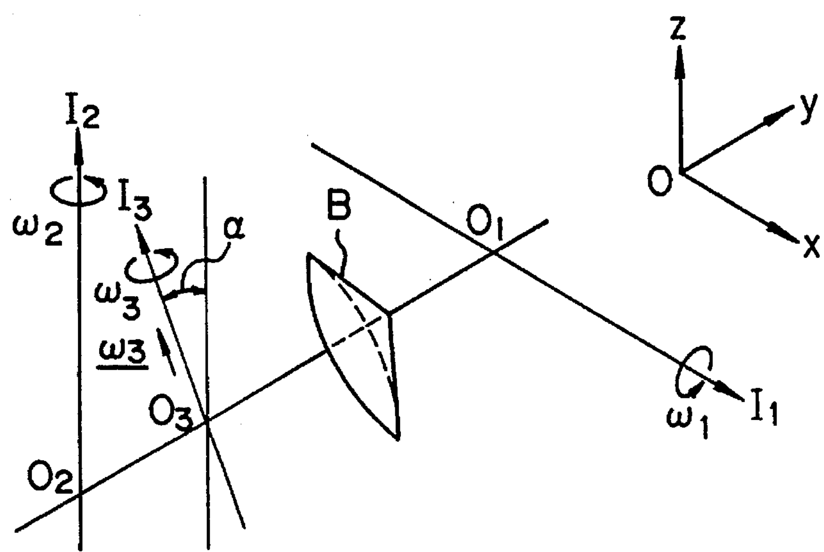
FIG. 2 is a view showing the relationship between the axes of a worm, a wheel and an intermediate gear when the globoid worm gears are generated by a conical-surface tool.
Figure 3:
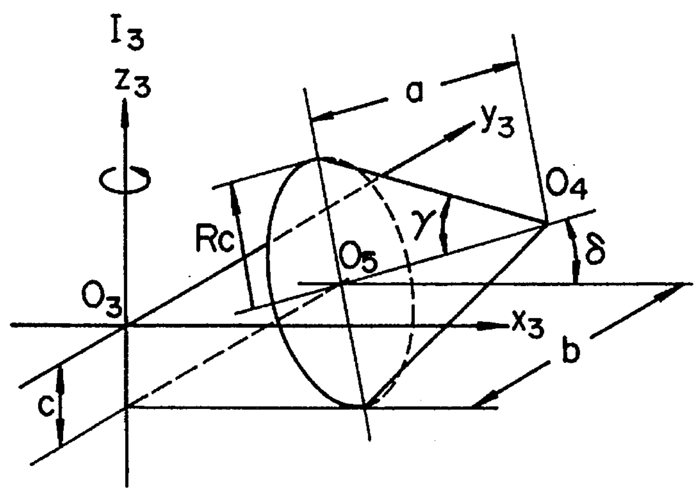
FIG. 3 is a view, on an enlarged scale, showing the relationship between the tooth surface of the intermediate gear shown in FIG. 2 and the axis thereof.

As shown in FIG. 2, the tooth surface of an intermediate gear consists of a conical surface B, and FIG. 3 shows the positional relationship between the axis of the intermediate gear and the tooth surface thereof more in detail.

The conical surface B which is the tooth surface of the intermediate gear has a semivertical angle $\gamma$ and the major axis $O_4O_5$ thereof ($O_4$ being the apex of the cone). The $z_3$ axis of the righthanded cartesian coordinate system $O_3$-$x_3y_3z_3$ fixed on the intermediate gear axis, the origin of which is the point $O_3$, coincides with the axis $I_3$ of the intermediate gear. The major axis of $O_4O_5$ lies in the plane wherein y=b and is inclined at an angle $\delta$ with respect to the plane $x_3y_3$. Thus, the point $O_5$ is the intersection between the major axis $O_4O_5$ and parallel plane ($Z_3$=−c) to the plane $x_3y_3$ and has the coordinates (0, b, −c). And $O_4O_5$=a.

The above-described generating method shown in FIG. 1 can be called a generating method using a plane tool, and the generating method shown in FIGS. 2 and 3 can be called a generating method using a conical-surface tool. In a generating method according to the present invention, a tool having an inverted conical-surface is utilized in place of the conical-surface tool shown in FIG. 3.

Figures 4A, 4B, 4C:
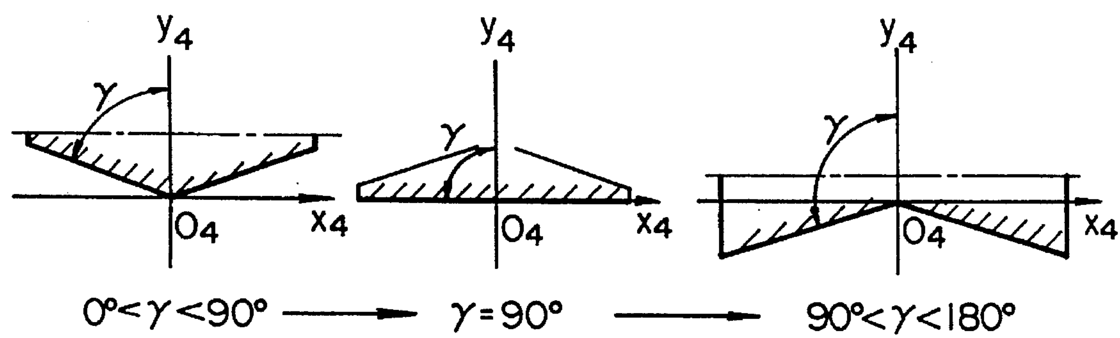
FIG. 4(A) is a view of the conical-surface tool.
FIG. 4(B) is a view of the plane tool.
FIG. 4(C) is a view of an inverted conical-surface tool.

Referring to FIG. 4, the conical-surface tool shown in FIG. 4(A) has a semivertical angle $\gamma$ larger than 0° and smaller than 90°. The plane tool shown in FIG. 4(B) has a semivertical angle $\gamma$ of 90°. The inverted conical-surface tool shown in FIG. 4(C) has a semivertical angle $\gamma$ of the conical surface (inverted conical surface) larger than 90° and smaller than 180°.

Thus, one of characteristics of the invention is that the semivertical angle y of the tool surface is larger than 90° and smaller than 180°.

A globoid worm gear generating method by the inverted conical-surface tool according to the invention will be described hereinafter.

The globoid worm gear generating method by the inverted conical-surface tool is also based on the basic member gear and secondary action theories described above. Accordingly, the positional relationships between the respective axes are similar to those in FIG. 1, and the above three conditions or equations (1), (2) and (3) must be equally satisfied. In addition, the essential feature of the present invention resides in the fact that the tool surface of an intermediate gear employs an inverted conical surface (an inverted conical-surface tool) on the basis of these conditions.

Figure 5:
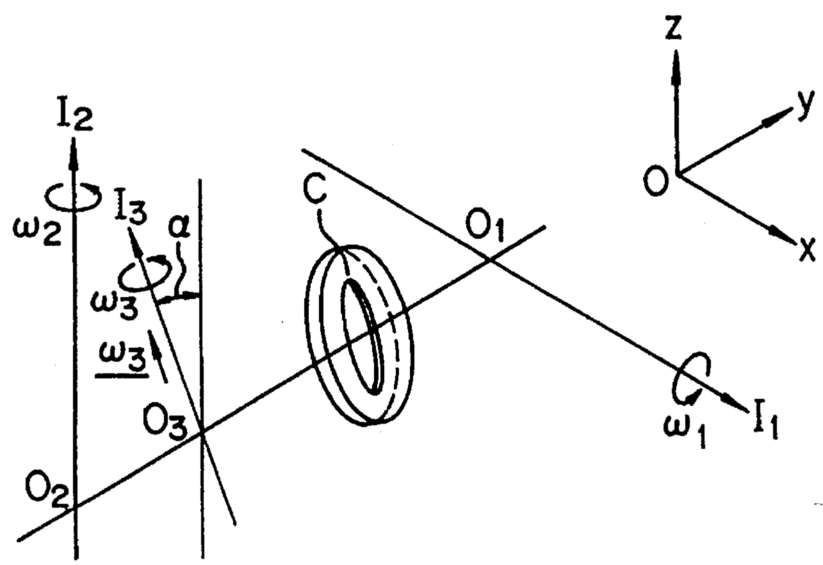
FIG. 5 is a view showing the relationship between the axes of a worm, a wheel and an intermediate gear when the globoid worm gears are generated by the inverted conical-surface tool.
Figure 6:
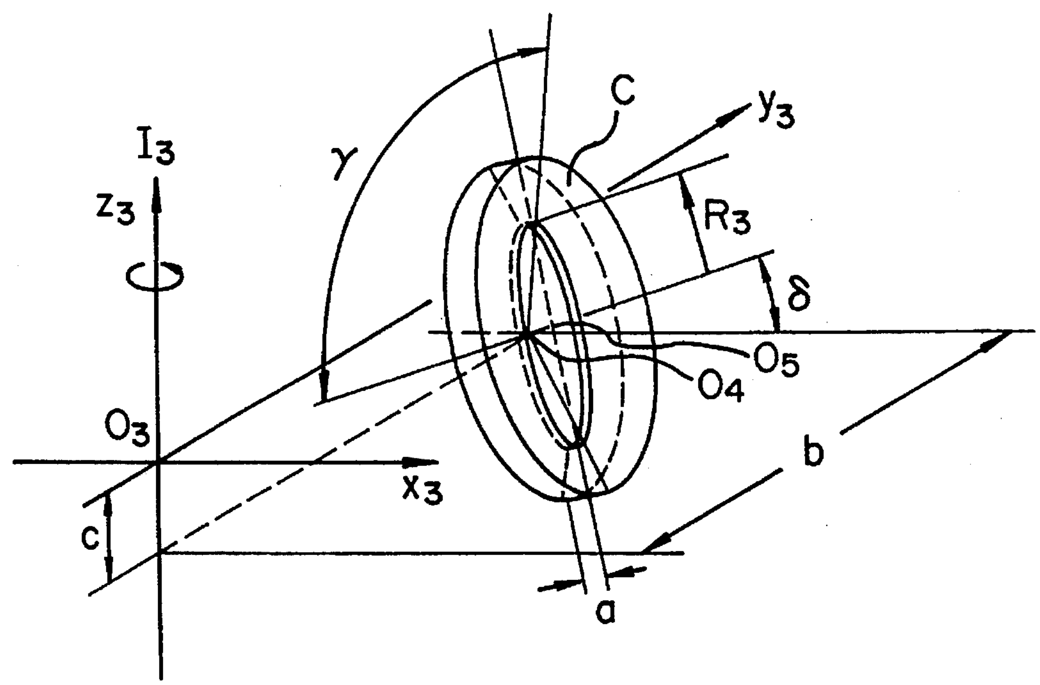
FIG. 6 is a view showing the relationship between the tooth surface of the intermediate gear shown in FIG. 5 and the axis thereof.

Referring to FIGS. 5 and 6, the positional relationship of the axes of a worm, a wheel and an intermediate gear in the globoid worm gear according to the invention and the relationship between the tooth surface of the intermediate gear and the axis thereof will be described as follows.

More specifically, similarly to the method using the conical-surface tool shown in FIGS. 2 and 3, the inverted conical surface C which is the tooth surface of the intermediate gear has a semivertical angle $\gamma$ and the major axis $O_4O_5$ thereof ($O_4$ being the apex of the inverted cone). The $z_3$ axis of the righthanded cartesian coordinate system $O_3$-$x_3y_3z_3$ fixed on the intermediate gear axis, the origin of which is the point $O_3$, coincides with the axis $I_3$ of the intermediate gear. The major axis $O_4O_5$ lies in the plane wherein $y_3$=b and is inclined at an angle $\delta$ with respect to the plane $X_3Y_3$. Thus, the point $O_5$ is the intersection between the major axis $O_4O_5$ and parallel plane ($z_3$=−c) to the plane $x_3y_3$ and has the coordinates (0, b, −c). And $O_4O_5$=a.

Figure 7A:
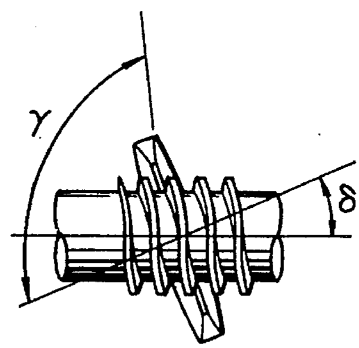
FIG. 7A shows a front view of an example wherein the inverted conical-surface tool is used under such a specific condition that $\alpha=0$ and $c=0$.
Figure 7B:
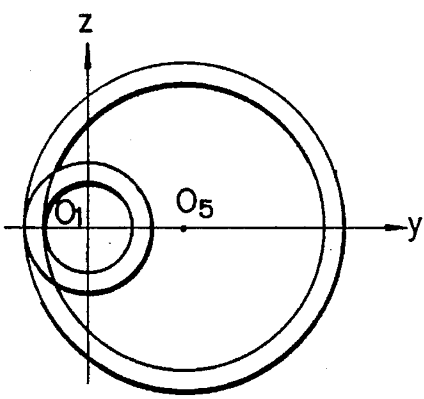
FIG. 7B is a side view of the example.

FIGS. 7A and 7B are views showing relationships of relative positions between the inverted conical-surface tool according to the invention and the worm gear. In this example, c=0, and $\alpha$=0. When c =0, the major axes of two inverted conical surfaces for generating both right and left tooth surfaces of a globoid worm coincide with each other so that they may be generated simultaneously. In addition, when $\alpha$=0, the axes of the intermediate gear and wheel coincide with each other; that is, the direct gear generating method.

Figure 8A:
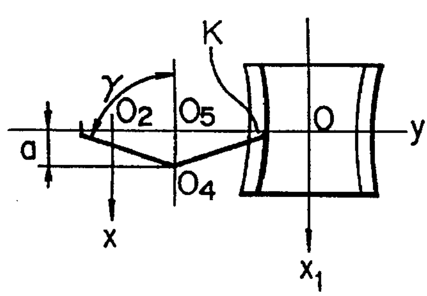
FIGS. 8A and 8B are views showing positions of tools and worm blanks when $c=0$ and $\alpha=0$, in which FIG. 8A indicates a case of the conical-surface tool and FIG. 8B indicates a case of the inverted conical-surface tool.
Figure 8B:
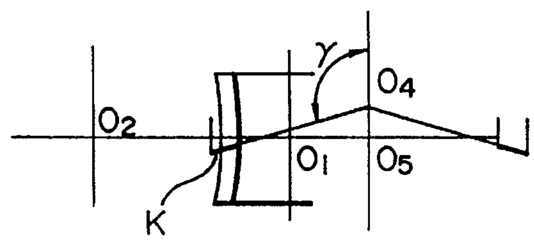
Figure 8B:
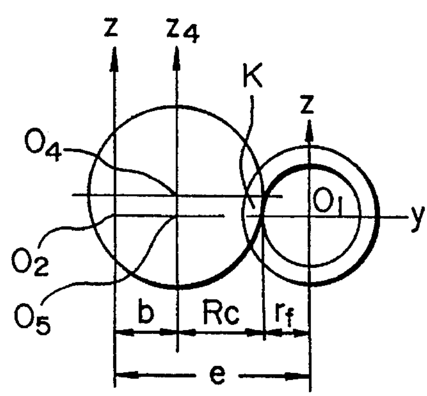
Figure 8B:
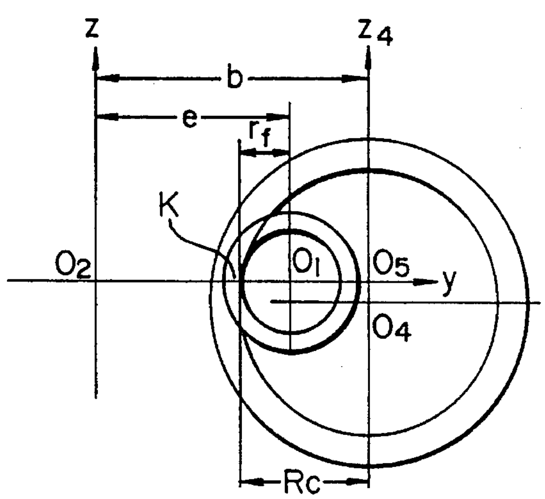

FIGS. 8A and 8B illustrate positions of the conical-surface tool and the inverted conical-surface tool, respectively when c=0 and $\alpha$=0. As shown in FIGS. 8A and 8B, the conical-surface tool generates a gear at a portion K in FIG. 8A, while the inverted conical-surface tool generates a gear at a portion K in FIG. 8B. The portions of the conical-surface tool and the inverted conical-surface tool used for generating the gears are clearly different from each other.

Figure 9A:
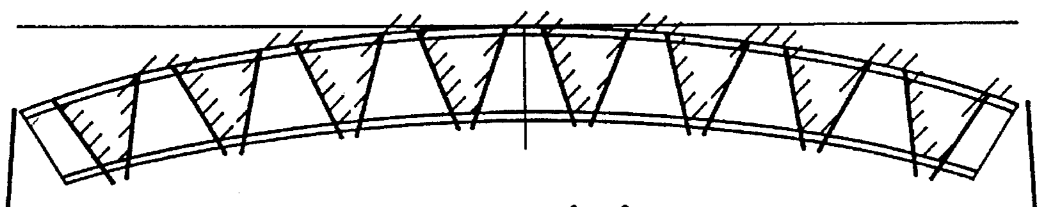
FIG. 9(A) shows the tooth profile of the gear generated by the conical-surface tool.
Figure 9B:
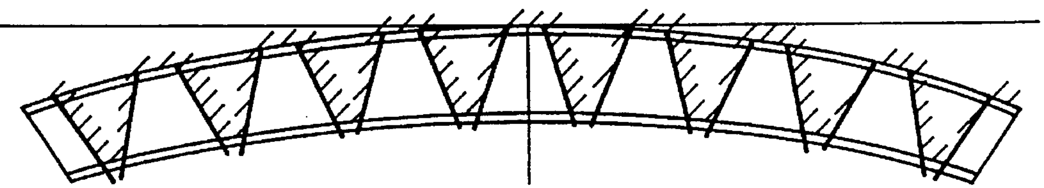
FIG. 9(B) shows the tooth profile of the gear generated by the inverted conical-surface tool and FIG. 9(C) shows a difference between the two tooth profiles.
Figure 9C:
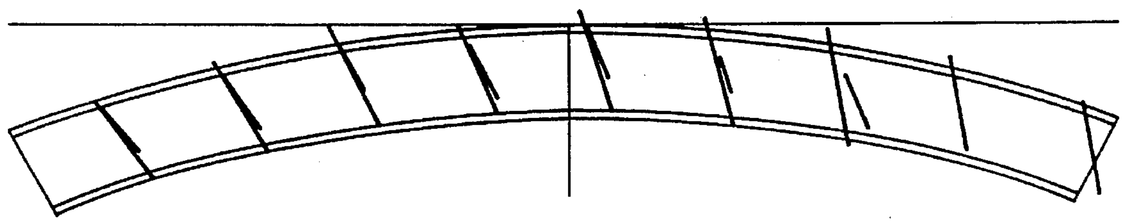

Next, a difference in profile of the tooth between the gears generated by the conical-surface tool and by the inverted conical-surface tool will be examined on the basis of FIG. 9. FIG. 9(C) shows the difference between the tooth profile of the gear generated by the conical-surface tool shown in FIG. 9(A) and the tooth profile of the gear generated by the inverted conical-surface tool shown in FIG. 9(B). As seen in FIG. 9(C), it is understood that the pressure angles are largely different from each other. This means that a finishing stock (grinding stock) is large when the gear tooth shape to be be finished by the inverted conical-surface tool is intended to be finished by the conical-surface tool (grindstone). Accordingly, if the inverted conical-surface tool is used as a finishing tool (grindstone), the grinding stock can be minimized so that a globoid worm can be obtained in a short period of time of thread chasing and grinding.

Figure 10A:
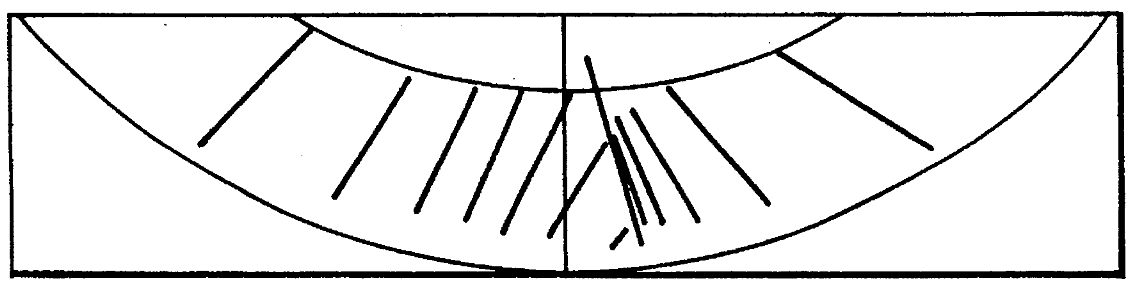
FIG. 10(A) is a view of the patterns of lines of contact when the gears are generated by the conical-surface tool.
Figure 10B:
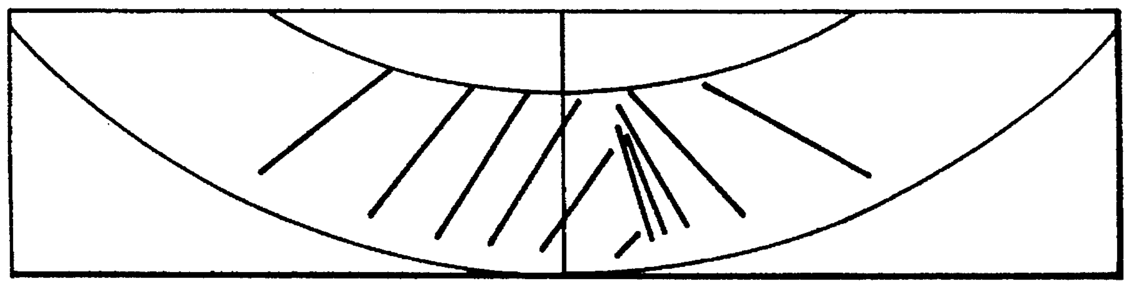
FIG. 10(B) is a view of the same when the gears are generated by the inverted conical-surface tool.
Figure 11:
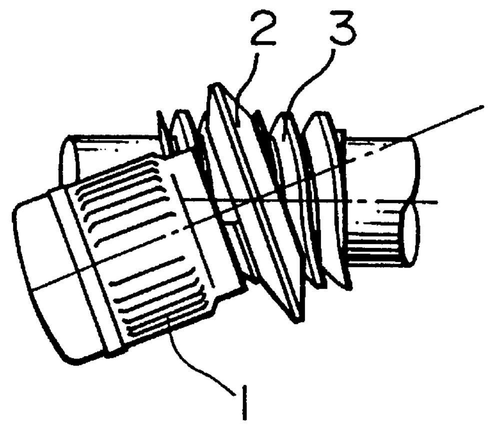
FIG. 11 is a schematic view for explanation of a globoid worm gear generating method using a conventional publicly-known conical-surface tool.
Figure 12:
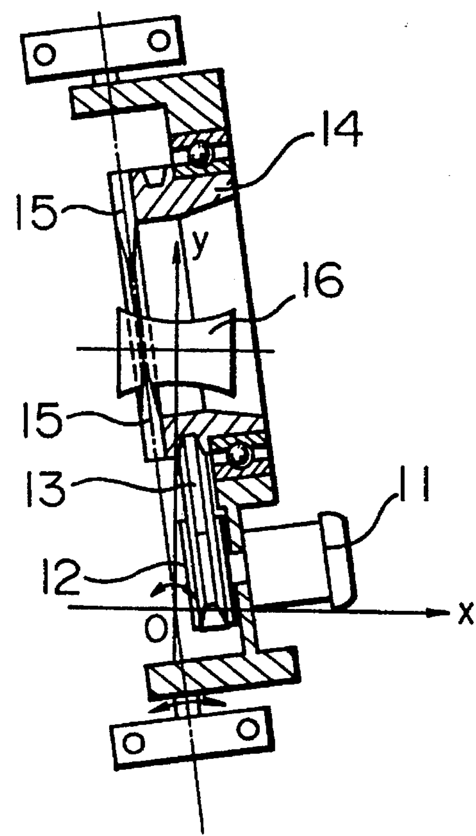
FIG. 12 is a schematic view of an apparatus for cutting a globoid worm gear with a conventional publicly-known milling cutter.

If the worm gear generated by the inverted conical-surface tool is inferior in performance to that obtained by the conventional publicly-known conical-surface tool, the use of the former tool cannot be considered to be favorable. However, as shown in FIGS. 10(A) and 10(B) which illustrate the pattern of lines of contact in case of generating the worm gear by the conical-surface tool and the pattern of lines of contact in case of generating the worm gear by the inverted conical-surface tool, respectively, the patterns of lines of contact in both cases almost coincide with each other. Further, as indicated in Table 1, there is little difference in respect of an angle between the direction of line of contact and a direction of slippage, a relative radius of curvature and a length of line of simultaneous contact. Therefore, the inverted conical-surface tool according to the invention can stand comparison with the conventional publicly-known conical-surface tool in regard to performance.

TABLE 1

COMPARISON OF CONTACT LINE AND RELATIVE RADIUS OF CURVATURE BETWEEN WORM GEARS GENERATED BY CONICAL-SURFACE TOOL AND INVERTED CONICAL-SURFACE TOOL

| ITEM OF COMPARISON | WORM GEAR GENERATED BY CONICAL-SURFACE TOOL | WORM GEAR GENERATED BY INVERTED CONICAL-SURFACE TOOL |
|---|---|---|
| ANGLE BETWEEN DIRECTIONS OF CONTACT LINE AND SLIPPAGE | 75° | 68° |
| RELATIVE RADIUS OF CURVATURE (mm) | 107 | 107 |
| LENGTH OF LINE OF SIMULTANEOUS CONTACT (mm) | 47 | 50 |

(Calculated under such a condition that a distance between the centers is 100 and a reduction ratio is 80)

As mentioned above, the present invention provides remarkable effects which will be described blow.

According to the invention, since a grinding stock is minimized, a period of time required for generating the gears can be reduced. Therefore, the invention is significantly effective as a globoid worm gear generating method. Also, the generating method of the invention is not inferior to a generating method using a conventional conical-surface tool in respect of performance.

What is claimed is:

1. A method of generating globoid worm gears based on the basic member gear theory, comprising the steps of:

defining the surface of a globoid worm generating tool as a tooth surface of an intermediate gear wholly by an inverted conical surface whose semivertical angle $\gamma$ is $90^\circ<\gamma 180^\circ$;

generating a globoid worm by giving a relational movement similar to that of a globoid worm wheel to said tool; and generating the worm wheel by a wheel generating tool having contour wholly similar to that of the globoid worm.

2. A method of generating globoid worm gears based on the basic member gear theory, comprising the steps of:

defining the surface of a globoid worm generating tool as a tooth surface of an intermediate gear partially by an inverted conical surface whose semivertical angle $\gamma$ is $90^\circ<\gamma< 180^\circ$;

generating a globoid worm by giving a relational movement similar to that of a globoid worm wheel to said tool; and generating the worm wheel by a wheel generating tool having contour partially similar to that of the globoid worm.

3. A method of generating globoid worm gears based on the basic member gear theory, comprising the steps of:

defining the surface of a globoid worm generating tool as a tooth surface of an intermediate gear partially by an inverted conical surface whose semivertical angle $\gamma$ is $90^\circ 21\ \gamma< 180^\circ$;

generating a globoid worm by giving a relational movement similar to that of a globoid worm wheel to said tool; and generating the worm wheel by a wheel generating tool having contour wholly similar to that of the globoid worm.

4. A method of generating globoid worm gears based on the basic member gear theory, comprising the steps of:

defining the surface of a globoid worm generating tool as a tooth surface of an intermediate gear wholly by an inverted conical surface whose semivertical angle $\gamma$ is $90^\circ<\gamma< 180^\circ$;

generating a globoid worm by giving a relational movement similar to that of a globoid worm wheel to said tool; and generating the worm wheel by a wheel generating tool having contour partially similar to that of the globoid worm.

* * * * *